Patented Feb. 17, 1931

1,792,939

UNITED STATES PATENT OFFICE

GERHARD KARL EMIL HEINRICH STAMPE, OF LUBECK, GERMANY, ASSIGNOR TO OTTO HEINRICH DRÄGER, OF LUBECK, GERMANY

ABSORBENT FOR GAS FILTERS PARTICULARLY FOR BREATHING PURPOSES

No Drawing. Application filed September 6, 1929, Serial No. 390,860, and in Germany September 29, 1928.

It is of importance, that the absorbent of filters for use in connection with gas masks is efficient in as many directions as possible. Frequently not only gases which belong to the same chemical group are to be absorbed, but the absorbent should at the same time be adapted to act against gases of very different chemical properties.

Particularly there is special need for a gas filter which acts against hydrogen sulphide as well as against ammonia. The physically adsorbing substances, such as activated charcoal have mostly little absorptive power for these two gases. By the present invention, however, I have succeeded to bind these gases chemically by cuprous chloride, CuCl, placed in a known manner on a suitable carrier substance, for instance pumice-stone. With ammonia, cuprous chloride reacts according to the general formula:

$$CuCl + xNH_3 = (Cu(NH_3)x)Cl.$$

It is known to use prepared pumice-stone as a gas filter against ammonia with copper sulphate ($CuSO_4$), which reacts in a similar way. This salt, however, has only little efficiency against hydrogen sulphide. Contrary to this cuprous chloride is capable of reacting in two different ways with hydrogen sulphide.

(1) A common precipitation of the cuprous sulphide takes place as follows:

$$2CuCl + H_2S = Cu_2S + 2HCl$$

(2) The copper-1-chloride will be oxidized to form cupric chloride, while subjected to the hydrogen ions of the hydrogen sulphide

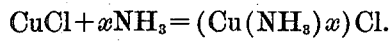

The $CuCl_2$ formed thus again is at disposal for a reaction similar to the first:

$$CuCl_2 + H_2S = CuS + 2HCl$$

The hydrochloric acid formed remains as such solved in the humidity of the compound or will be adsorbed on the carrier substance. Particularly the later action may be promoted, if such a carrier substance is chosen, which in itself has high adsorbing qualities, for instance activated charcoal or inorganic gels. By so proceeding the efficiency of the filtering material designated above increases at the same time. Moreover it will obtain a certain efficiency against the substances, which are caught by pure adsorption, for instance against hydrocarbons such as gasoline or the like.

In the manner stated a filtering material is secured, which is effective in a great many directions.

The chemical efficiency against the named gases, particularly against hydrogen sulphide, may be increased, if the carrier substance is saturated with a solution which for itself easily reacts on the gas. As such a concentrated solution of nitrate of lead ($Pb(NO_3)_2$) is particularly well adapted, which for itself does not react with cuprous chloride. The nitrate of lead which after the treatment is present in the carrier grain absorbs a large amount of hydrogen sulphide and renders the copper salt disposable for a reaction with ammonia.

Example 10 kilograms activated charcoal having grains of a medium size are saturated with a solution of 2 kilograms nitrate of lead in 160 kilograms water. The humid material thereupon is intimately mixed with 4 kilograms finely powdered cuprous chloride and slowly dried at a low temperature. With such treatment the copper salt firmly adheres to the coal.

I claim:—

1. An absorbent for gas filters particularly for breathing purposes which is adapted to remove ammonia as well as hydrogen sulphide, consisting of cuprous chloride placed on a solid carrier substance.

2. An absorbent according to claim 1, wherein the carrier substance is a member of the group comprising activated charcoal and activated inorganic gel.

3. An absorbent according to claim 1, wherein the carrier substance in addition carries a deposited salt which is adapted to chemically combine with the gases.

4. An absorbent according to claim 1, wherein the carrier substance is saturated with an aqueous solution of nitrate of lead.

5. An absorbent as claimed in claim 1 in which the carrier substance is composed of highly adsorptive material.

In testimony whereof I have signed my name to this specification.

GERHARD KARL EMIL HEINRICH STAMPE.